United States Patent [19]

Hawn

[11] Patent Number: 4,856,799
[45] Date of Patent: Aug. 15, 1989

[54] SNOWMOBILE TOW BAR APPARATUS

[76] Inventor: Douglas L. Hawn, P.O. Box 258, Piedmont, S. Dak. 57769

[21] Appl. No.: 204,006

[22] Filed: Jun. 8, 1988

[51] Int. Cl.$^4$ .......................... B60D 1/02; B60D 1/14
[52] U.S. Cl. .................................... 280/24; 280/491.4
[58] Field of Search ................. 280/24, 491 E, 491 D, 280/491 R, 493, 491 B

[56] References Cited

U.S. PATENT DOCUMENTS

| | | | |
|---|---|---|---|
| 3,334,916 | 8/1967 | Tibbals | 280/491 R |
| 3,781,038 | 12/1973 | Bachel et al. | 280/491 D |
| 3,797,846 | 3/1974 | Pevic | 280/24 |
| 3,810,662 | 5/1974 | Commanda | 280/491 E |
| 4,047,734 | 9/1977 | Miles | 280/491 E |
| 4,266,800 | 5/1981 | Hawkins | 280/491 E |
| 4,353,563 | 10/1982 | Foster | 280/24 |
| 4,614,354 | 9/1986 | Stagner | 280/491 D |
| 4,640,523 | 2/1987 | Wolmarans | 280/491 D |

Primary Examiner—John A. Pekar
Attorney, Agent, or Firm—Leon Gilden

[57] ABSTRACT

A foldable portable snowmobile tow bar is set forth for the towing of disabled snowmobiles provided with a forward hitch pivotally mounting a plurality of legs foldable surrounding said hitch in a first position and extending rearwardly of said hitch in a second position. An adjustable cross link securing the two legs together fixedly secures the two legs in a predetermined angulation relative to one another in said second position. A plurality of through extending pins in respective bifurcated ends secures said tow bar and said legs to an associated disabled snowmobile.

1 Claim, 1 Drawing Sheet

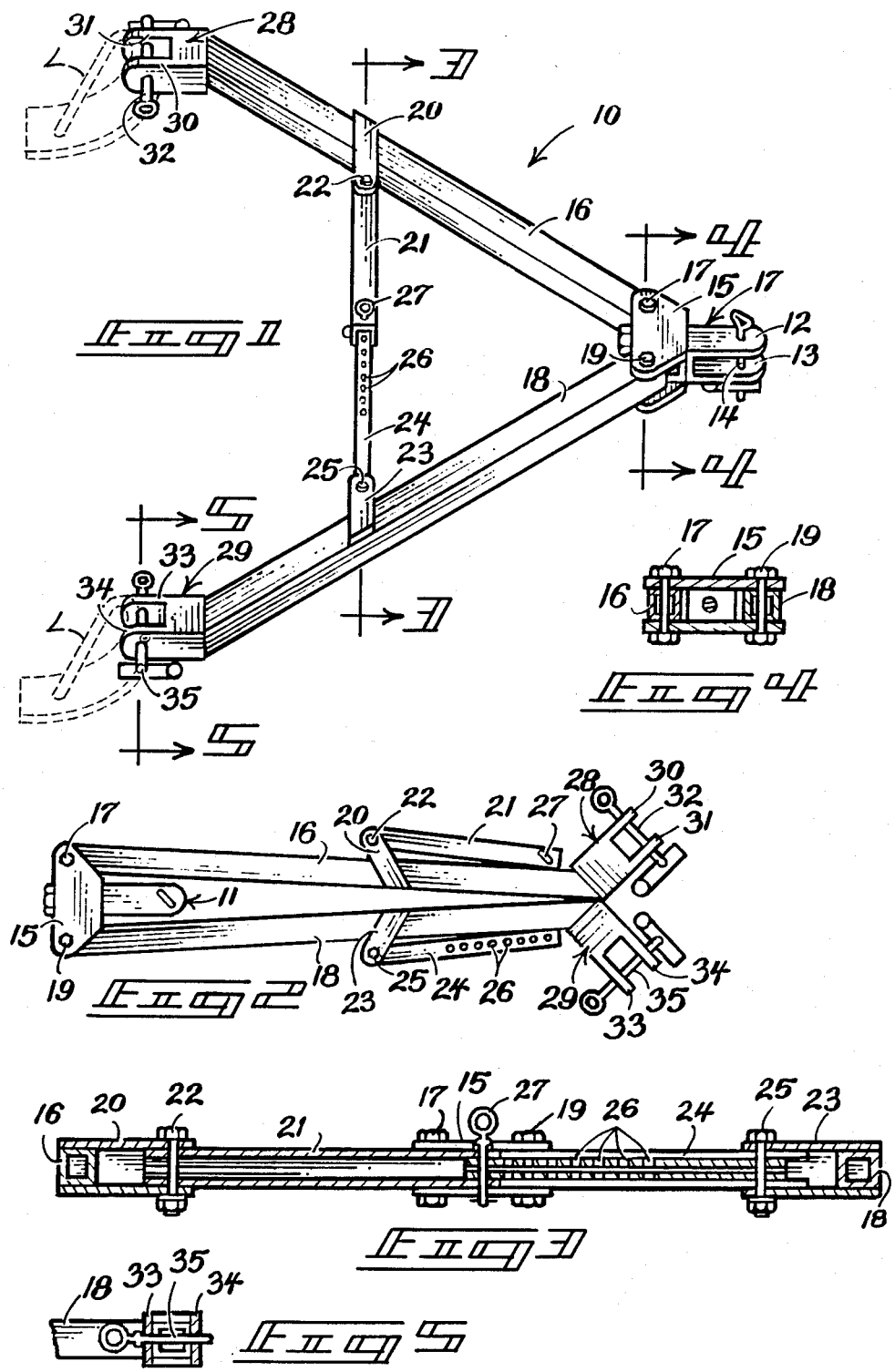

SNOWMOBILE TOW BAR APPARATUS

BACKGROUND OF THE INVENTION

1. Field of the Invention

The instant invention relates to tow bars, and more particularly pertains to a new and improved tow bar for securement to an associated disabled snowmobile.

2. Description of the Prior Art

The use of tow bars is well known in the prior art, as are tow bars for use in the towing of disabled snowmobiles. Conventionally, the tow bars for snowmobiles have been of a unitary or awkward construction to limit their effectiveness in the towing of snowmobiles, particularly when disabled. For example, U.S. Pat. No. 3,797,846 to Pevic sets forth a tow bar for use with snowmobiles wherein a generally "T" shaped clamp bar is secured to opposed ends of forward portions of snowmobile skis with an orthogonally directed rod coupled to a hitch for securement to a tow vehicle. The Pevic patent relies on a single connection between the forwardly projecting rod and cross rod wherein inherent undesirable degree of flexure is created minimizing stability of the apparatus, as opposed to the instant invention.

U.S. Pat. No. 3,810,662 to Commando sets forth a towing arrangement for a snowmobile that includes a forwardly projecting rod securable to forward portions of skis of a snowmobile, as in the Pevic patent, utilizing a plurality of downwardly projecting braces that fails to provide the strength and effectiveness of the instant invention as well as lacking the compact foldable organization available in the instant invention.

U.S. Pat. No. 4,047,734 to Miles sets forth a tow bar in use with tow vehicles in general on a spring biased locking member adapting engaged on a flat forward portion of a vehicle to be towed including a lever locking means wherein the Miles patent is cited for the simplicity of construction, but as may be observed is of a relatively remote organization to that of the instant invention.

U.S. Pat. No. 4,266,800 to Hawkins sets forth a tow bar for use in towing vehicles formed with a forward yoke and a plurality of diverging arms securable therefrom for attachment to a forward automobile bumper to be towed. Adjustment of the arms is provided by sliding engagement along a rearwardly extending frame member from the forward yoke to slidingly accept an adjustable arm portion securable between said diverging arms, as opposed to the instant invention wherein the apparatus may be overfolded relative to the yoke to present a compact organization for storage and use in association with a snowmobile.

U.S. Pat. No. 4,353,563 to Foster sets forth a "T" bar arrangement for securement to a snowmobile wherein a cross bar is integrally and orthogonally secured to a forwardly extending rod that, as in other prior art inventions, lacks the stability and rigidity of the instant invention as well as a lack of a compact folding organization, as the instant invention provides.

As such, it may be appreciated that there is a continuing need for a new and improved snowmobile tow bar apparatus which combines the features of compactness of structure when not in use that may be readily opened for utilization, and in this respect, the present invention substantially fulfills this need.

SUMMARY OF THE INVENTION

In view of the foregoing disadvantages inherent in the known types of tow bar apparatus now present in the prior art, the present invention provides an snowmobile tow bar apparatus wherein the same may be compactly stored when not in use and can be further easily and efficiently transported during periods of nonuse. As such, the general purpose of the present invention, which will be described subsequently in greater detail, is to provide a new and improved snowmobile tow bar apparatus which has all the advantages of the prior art tow bar apparatus and none of the disadvantages.

To attain this, the present invention comprises a snowmobile tow bar apparatus which can be compactly overfolded relative to a forwardly extending yoke wherein a telescoping intermediate portion secures the diverging legs of the tow bar apparatus in a predetermined angulation relative to a snowmobile wherein a plurality of bifurcated clevis joints utilize a through extending pin for securement to a forward portion of a snowmobile ski pair formed with a conventional loop wherein the pins extend and capture the loops within the clevis.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved snowmobile tow bar apparatus which has all the advantages of the prior art snowmobile tow bar apparatus and none of the disadvantages.

It is another object of the present invention to provide a new and improved snowmobile tow bar apparatus which may be easily and efficiently manufactured and marketed.

It is a further object of the present invention to provide a new and improved snowmobile tow bar apparatus which is of a durable and reliable construction.

An even further object of the present invention is to provide a new and improved snowmobile tow bar apparatus which is susceptible of a low cost of manufacture with regard to both materials and labor, and which accordingly is then susceptible of low prices of sale to the consuming public, thereby making such snowmobile tow bar apparatus economically available to the buying public.

Still yet another object of the present invention is to provide a new and improved snowmobile tow bar apparatus which provides in the apparatuses and methods of the prior art some of the advantages thereof, while simultaneously overcoming some of the disadvantages normally associated therewith.

Still another object of the present invention is to provide a new and improved snowmobile tow bar apparatus wherein the same may be compactly overfolded for storage and portability and formed with a telescoping medially oriented adjustment bar between a plurality of rearwardly diverging legs of a forwardly extending yoke for adjustment of the snowmobile tow bar apparatus to a range of snowmobile vehicles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric view of the instant invention secured to an associated snowmobile (illustrated in phantom).

FIG. 2 is a top orthographic view of the instant invention in an overfolded stored orientation.

FIG. 3 is an orthographic view taken along the lines 3—3 of FIG. 1 in the direction indicated by the arrows.

FIG. 4 is an orthographic view taken along the lines 4—4 of FIG. 1 in the direction indicated by the arrows.

FIG. 5 is an orthographic view taken along the lines 5—5 of FIG. 1 in the direction indicated by the arrows.

DESCRIPTION OF THE PREFERRED EMBODIMENT

With reference now to the drawings, and in particular to FIGS. 1 to 5 thereof, a new and improved snowmobile tow bar apparatus embodying the principles and concepts of the present invention and generally designated by the reference numeral 10 will be described.

More specifically, it will be noted that the snowmobile tow bar apparatus 10 essentially comprises a forward clevis yoke 11 formed with parallel spaced upper and lower arms 12 and 13 respectively with a first through extending pin and lock pin 14 extending orthogonally through the upper and lower arms. It may be noted that the forward mount 15 is formed of a generally trapezoidal configuration to accept the pivotally mounted arms 16 and 18 therein within spaced arms relative to the forward clevis yoke 11 to enable an overfolded configuration, as illustrated in FIG. 2.

A forward mount 15 integrally secures the forward clevis yoke 11 thereto and is formed with a plurality of pivot joints comprising a first pivot joint 17 and a second pivot joint 18 securing a first leg 16 and second a leg 18 respectively to the forward mount 15. The forward mount 15 is formed with a plurality of spaced parallel rearwardly extending arms relative to the forward yoke 11 to accept the respective arms 16 and 18 therethrough.

Integrally sandwiching upper and lower surfaces of the respective arms 16 and 18 are a first support mount 20 and a second support mount 23. As illustrated in FIGS. 1 and 3, the support mounts 20 and 23 sandwich a first link 21 and a second link 24 therebetween and pivotally secure the links 21 and 24 by means of respective first link pivot 22 and second link pivot 25.

A first link 21 and a second link 24 are respectively and pivotally secured to the first and second mounts 20 and 23 respectively. The second link 24 has formed therethrough a plurality of aligned apertures 26 for cooperation with a second through extending pin 27, as illustrated in FIGS. 1 and 3 for example, wherein the second link 24 telescopingly interfits within the first link 21 to adjust the angularity of the first and second arms 16 and 18 in respect to one another in securement and accommodation of a wide range of snowmobile forward ski portions.

The first and second legs 16 and 18 respectively terminate rearwardly in a first rear clevis and a second rear clevis 29. The first rear clevis 28 is formed with a plurality of legs comprising a first leg 30 and a second leg 31 parallel to each other where similarly a first leg 33 and a second leg 34 are parallel to one another in the second rear clevis 29. The legs 30, 31, 33, and 34 are parallel to one another and orthogonal to the legs 12 and 13 of the forward clevis yoke 11. A plurality of pins comprising a third through extending pin 32 and a fourth through extending pin 35 respectively depend through the legs of the first and second rear clevis joints respectively to thereby secure the respective loops "L" of forward portions of skis of a typical snowmobile, as illustrated in phantom in FIG. 1.

It may be appreciated therefore that by means of adjustment of the first and second links 21 and 24 and associated second through extending pin 27, the legs 16 and 18 will accommodate a wide range of snowmobiles to be towed.

When not in use, the second through extending pin 27 is merely removed to enable withdrawal of the second link 24 from within the first link 21 and thereafter the arms 16 and 18 are merely rotated about the respective first and second pivot joints 17 and 19 to the forwardmost position, as illustrated in FIG. 2. Also, the first and second links 21 and 24 respectively are pivoted adjacent the respective arms 16 and 18 respectively to provide a compact structure, as illustrated in FIG. 2. Also as illustrated, it may be noted that the first and second rear clevis joints 28 and 29 are oriented at respective oblique angles relative to the first and second arm 16, 18 to provide an aligned relationship with the skis and loops "L" of the associated snowmobile.

As to the manner of usage and operation of the instant invention, the same should be apparent from the above disclosure and accordingly no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A snowmobile tow bar apparatus for securement to forward portions of spaced snowmobile skis, said apparatus comprising, a forward mount including a forward yoke orthogonally and integrally secured to said mount and projecting forwardly of said mount from a forward face thereof, and first and second arms pivotally mounted to said mount at first and second pivot connections, and said first and second arms pivotally mounted to opposite ends of said mount wherein said first and second arms diverge relative to one another rearwardly of said mount in a first position, and said first and second arms are adjacent to another and projecting forwardly of said mounts in a second position, and first and second links adjustably securable to each other at first ends of said links and pivotally mounted relative to said respective first and second arms at remote second ends of said links, and said first and second arms terminating in clevis yokes at respective ends of said arms remote from said mount, and wherein said mount is of a trapezoidal configuration with spaced upper and lower plates wherein said first and second arms are pivotally mounted between said plates, and said forward yoke is integrally secured to said mount to a plate orthogonally and integrally connecting said upper and lower plates, and wherein said second link is formed with a series of aligned apertures and said second link is telescopingly received within said first link wherein a through extending pin positionable through said first link captures said second link and extends through one of said apertures, and wherein said first and second links are secured to said respective first and second arms by respective first and second support mounts including spaced plates, wherein said spaced plates are secured to upper and lower surfaces of said first and second arms to capture pivotally therebetween said respective first and second links, and wherein the clevis yokes integrally secured to said first and second arms each include a plurality of spaced parallel legs, and said forward yoke includes a plurality of spaced parallel legs wherein the legs of said forward yoke are orthogonally oriented relative to said legs of said clevis yokes.

* * * * *